US006847671B1

(12) United States Patent
Baumler

(10) Patent No.: US 6,847,671 B1
(45) Date of Patent: Jan. 25, 2005

(54) BLOWER FOR GAS LASER

(75) Inventor: Juergen Baumler, Osterode (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/823,298

(22) Filed: Mar. 29, 2001

Related U.S. Application Data

(60) Provisional application No. 60/193,048, filed on Mar. 29, 2000.

(51) Int. Cl.[7] .................................................. H01S 3/22
(52) U.S. Cl. .............................. 372/58; 372/55; 372/57; 372/61
(58) Field of Search .............................. 372/55, 57, 58, 372/59, 61, 62, 65, 85; 415/68, 134, 4.5; 403/164, 1, 47, 62, 116, 121, 206; 464/179, 180, 18

(56) References Cited

U.S. PATENT DOCUMENTS

| 4,096,449 | A | 6/1978 | Foster ................. 331/94.5 PE |
| 4,571,730 | A | 2/1986 | Mizoguchi et al. ........... 372/58 |
| 4,611,327 | A | 9/1986 | Clark et al. .................... 372/58 |
| 4,622,675 | A | 11/1986 | Penn ............................ 372/58 |

(List continued on next page.)

FOREIGN PATENT DOCUMENTS

JP        61-116889       6/1986       ............. H01S/3/04

OTHER PUBLICATIONS 2 sheets of papers: Fan, source: unknown.
Encyclopedia reference: Propeller (aircraft), source: unknown, pp. 383–386.
Robert Coester, "Theoretische und experimentelle Undersuchungen as Querstromgebläsen," *Mitteilungen Aus Dem Institut fur Aerodynamik, Verlag Leemann Zürich*. No. 28, 1959, pp. 11, 37–38.
Davis, Casting Processes and Procedures, *Solidification and Casting*, Applied Science Publishers, Ltd., 1976, pp. 147–159.

*Primary Examiner*—Tom Thomas
*Assistant Examiner*—Matthew C Landau
(74) *Attorney, Agent, or Firm*—Stallman & Pollock LLP

(57) ABSTRACT

A tangential blower for use in a gas discharge laser is provided provides improved homogeneity of laser gas flow through the discharge region of the laser. A flange which supports adjacent blower sections has an aerodynamic shape and occupies a minimal portion of the space in the inlet region of the blowers. The ends of the blower's shafts may be formed as a twice-profiled polygon which is has a non-uniform and preferably rounded geometry along its longitudinal axis where it fits into end flanges. The blades of the blower may be formed with varying thickness and radii of curvature. The blower's blades and hubs may be cast as a single piece of steel, titanium alloy, or other suitable material.

18 Claims, 9 Drawing Sheets

U.S. PATENT DOCUMENTS

| | | | |
|---|---|---|---|
| 4,646,310 A | 2/1987 | Koseki | 372/58 |
| 4,686,680 A | 8/1987 | Hoag et al. | 372/58 |
| 4,686,682 A | 8/1987 | Haruta et al. | 372/87 |
| 4,691,322 A | 9/1987 | Nozue et al. | 372/82 |
| 4,730,332 A | 3/1988 | Hoag | 372/87 |
| 4,734,916 A | 3/1988 | Hoag | 372/65 |
| 4,760,581 A * | 7/1988 | Hoag | 372/34 |
| 4,891,818 A | 1/1990 | Levatter | 372/57 |
| 4,899,363 A | 2/1990 | Murray et al. | 372/65 |
| 4,959,840 A | 9/1990 | Akins et al. | 372/57 |
| 4,975,925 A | 12/1990 | Derrickson | 372/58 |
| 5,200,970 A * | 4/1993 | Klopotek | 372/55 |
| 5,247,534 A | 9/1993 | Muller-Horsche | 372/58 |
| 5,247,535 A | 9/1993 | Muller-Horsche et al. | 372/86 |
| 5,291,509 A | 3/1994 | Mizoguchi et al. | 372/65 |
| 5,337,215 A | 8/1994 | Sunderland et al. | 361/726 |
| 5,373,523 A | 12/1994 | Fujimoto et al. | 372/59 |
| 5,396,514 A | 3/1995 | Voss | 372/57 |
| 5,412,682 A | 5/1995 | Laudenslager et al. | 372/65 |
| 5,748,656 A | 5/1998 | Watson et al. | 372/35 |
| 5,754,579 A | 5/1998 | Mizoguchi et al. | 372/58 |
| 5,764,666 A | 6/1998 | Wakabayashi et al. | 372/38 |
| 5,770,933 A | 6/1998 | Larson et al. | 318/254 |
| 5,771,258 A | 6/1998 | Morton et al. | 372/57 |
| 5,848,089 A | 12/1998 | Sarkar et al. | 372/58 |
| 5,870,420 A | 2/1999 | Webb | 372/58 |
| 5,978,405 A | 11/1999 | Juhasz et al. | 372/57 |
| 5,991,324 A | 11/1999 | Knowles et al. | 372/57 |
| 6,014,397 A | 1/2000 | Ishihara et al. | 372/57 |
| 6,018,537 A | 1/2000 | Hofmann et al. | 372/25 |
| 6,023,486 A | 2/2000 | Hofmann et al. | 372/58 |
| 6,026,103 A | 2/2000 | Oliver et al. | 372/37 |
| 6,034,978 A | 3/2000 | Ujazdowski et al. | 372/34 |
| 6,034,984 A | 3/2000 | Hofmann et al. | 372/58 |
| 6,061,376 A | 5/2000 | Hofmann et al. | 372/58 |
| 6,104,735 A | 8/2000 | Webb | 372/37 |
| 6,128,323 A | 10/2000 | Myers et al. | 372/38 |
| 6,144,686 A | 11/2000 | Hofmann et al. | 372/58 |
| 6,157,662 A | 12/2000 | Scaggs et al. | 372/60 |
| 6,188,709 B1 | 2/2001 | Webb | 372/57 |
| 6,195,378 B1 * | 2/2001 | Hofmann | 372/58 |
| 6,208,674 B1 | 3/2001 | Webb et al. | 372/57 |
| 6,208,675 B1 * | 3/2001 | Webb | 372/58 |
| 6,212,211 B1 | 4/2001 | Azzola et al. | 372/33 |
| 6,212,214 B1 | 4/2001 | Vogler et al. | 372/59 |
| 6,240,112 B1 | 5/2001 | Partlo et al. | 372/34 |
| 6,250,886 B1 * | 6/2001 | Immell et al. | 416/214 R |
| 6,298,675 B1 | 10/2001 | Dage et al. | 62/133 |

* cited by examiner

US 6,847,671 B1

BLOWER FOR GAS LASER

PRIORITY

This invention claims the benefit of priority to U.S. provisional patent application No. 60/193,048, filed Mar. 29, 2000.

BACKGROUND OF THE INVENTION

1. Field of the Invention

This invention relates to tangential blowers (also known as cross-flow blowers) generally and more particularly to tangential blowers used for circulating gas within a gas discharge laser.

2. Discussion of the Related Art

Tangential blowers have been used in various applications for several decades. Interest in tangential blowers has been heightened in recent years because such blowers are well suited for use in pulsed gas discharge lasers.

The operation of a typical electrical discharge system for a gas discharge laser is shown in FIG. 1. Electrodes 101 and 102 are separated by a gap where the gas discharge occurs. This discharge occurs quickly and is typically repeated many times per second. It is recognized herein that for various applications including microlithography, repetition rates of 1000 Hz and more may be used.

Laser gas is circulated around a chamber and through the discharge gap. The gas is circulated within the chamber by a cross-flow or tangential blower, as shown in FIG. 1. Cross-flow blower 103 comprises shaft 104, which is normally parallel to blades 105. The housing 106 contains the laser gas. When cross-flow blower 103 rotates, gas is circulated between electrodes 101 and 102. FIG. 2 illustrates the air flow through a cross-flow blower.

Operating in a gas discharge chamber places numerous demands on the blower. Normally, the laser gas is strongly electronegative and therefore corrosive. In addition, a pulse rate of 1000 Hz means that a blower may revolve at, e.g., 3,300 r.p.m. in order to clear the gas from the discharge region between pulses. At such speeds, the bearings, shaft and other structural elements are subjected to stresses and vibrations. At still it) further higher repetition rates such as 2 kHz or more, at which repetition rates it is recognized herein that it is desired to have excimer and molecular fluorine lasers capable of operating at, there is still greater demands on the gas flow speed. That is, to fully clear the gas through the discharge volume, or volume of space between the electrodes that participates in the discharge, from one pulse to a succeeding pulse, either the gas flow speed is to be increased or the electrode width is to be reduced, or a combination of these two, to ensure that the gas mixture clears the discharge region from pulse to pulse at these higher repetition rates.

In part because of the demands of operating in a gas discharge chamber, there have been recent attempts to strengthen tangential blowers and make their components more durable. One approach is described in U.S. Pat. No. 5,870,420, which is hereby incorporated by reference and which teaches the use of truss elements welded to the inside of the frame of a cross-flow blower, as illustrated in FIG. 3. This patent describes blades with a single radius of curvature. The blades are fitted into slots in the frame and welded to the frame.

However, the braced tangential blower described in the '420 patent increased the gas flow rate by only a few percent as compared to conventional tangential blowers operated at the same speed. In order to obtain this modest increase in flow rate, the trussed blower required an increase in current of 27% to 28% as compared to a non-trussed tangential blower. A blower which is stiffer than the trussed blower of the '420 patent would be desirable, so that the blower could be rotated faster without excessive vibrations.

In order to add stiffness to the blower and reduce vibration, the blower may be divided into two or more sections in an axial direction, as illustrated in FIG. 4. However, one consequence of dividing the blower into sections is that a region of non-homogenous laser gas flow is created in the discharge gap between the two electrodes. As shown in the cross-sectional view of FIG. 5, flange 201 divides the blower cavity into two axial compartments. The laser gas from both compartments is not allowed to interflow until after being discharged from the blowers and directly before entering the discharge gap between the electrodes. In the short distance between the end of the top portion of flange 201 and the discharge gap, the laser gas volumes from either side of the flange have not had an opportunity to properly interflow, and there is a volume of inhomogeneous gas as shown at FIG. 4 between the two laser gas volumes that are directed to the discharge gap. This inhomogeneous laser gas volume lowers the productivity of the laser. It would be desirable to provide a device for supporting the interior ends of the blowers without creating such a region of inhomogeneous laser gas.

SUMMARY OF THE INVENTION

In view of the above, it is an object of the present invention to provide a tangential blower with a smaller region of inhomogeneous laser gas, especially in the discharge area of the blower.

It is a further object of the present invention to provide a more efficient tangential blower.

It is a further object of the present invention to provide a tangential blower which is stronger and stiffer than conventional blowers.

It is a feature of the present invention to provide a tangential blower with blades which have an aerodynamic shape.

It is another feature of the present invention to provide a tangential blower, the blades and hubs of which have been cast as a single piece.

It is a feature of the present invention to provide a tangential blower in which rounded portions of the shaft are fitted to the end hubs of the blowers.

It is an advantage of the present invention that the tangential blower provided is more durable.

It is a further advantage of the present invention that the tangential blower provided creates less turbulence and reduces the region of inhomogeneous flow between blower sections.

According to one embodiment, a tangential blower is provided in which the thickness and radii of curvature of the blades are varied.

According to another embodiment, the ends of a tangential blower's shaft are formed as a twice-profiled polygon which is rounded along its longitudinal axis where it fits into end flanges.

According to yet another embodiment, the blades and hubs of a tangential blower are cast as a single piece.

According to still another embodiment, an improved flange supports the tandem blower sections while occupying less space than related art flanges, thereby reducing the region of inhomogeneous flow in the discharge area of the blower.

DETAILED DESCRIPTION OF THE PREFERRED EMBODIMENTS

Improved Flange for Joining Blower Sections

Figure 1:
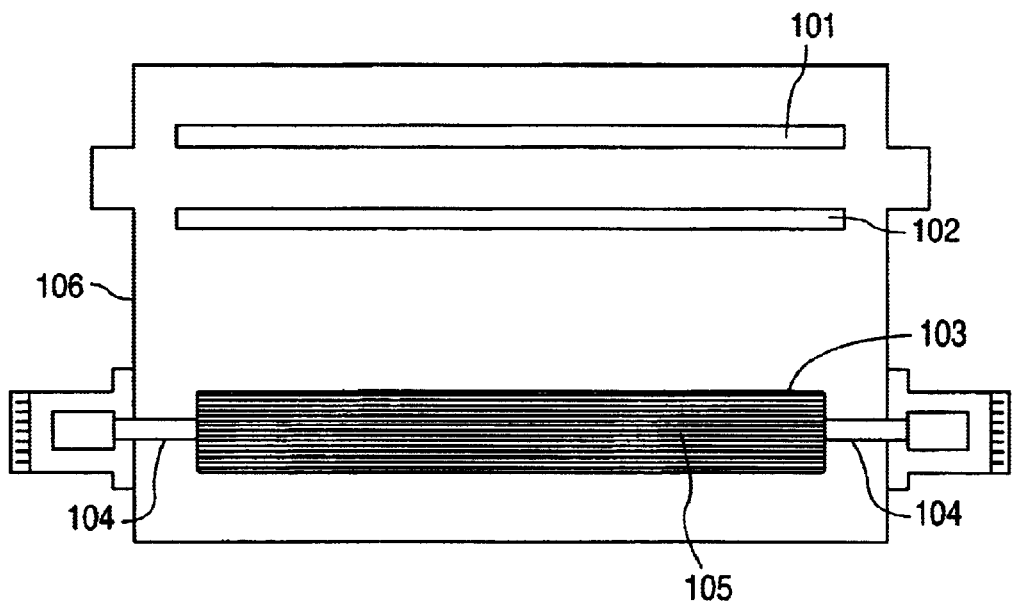
FIG. 1 illustrates a gas discharge chamber of a known gas discharge laser.
Figure 2:
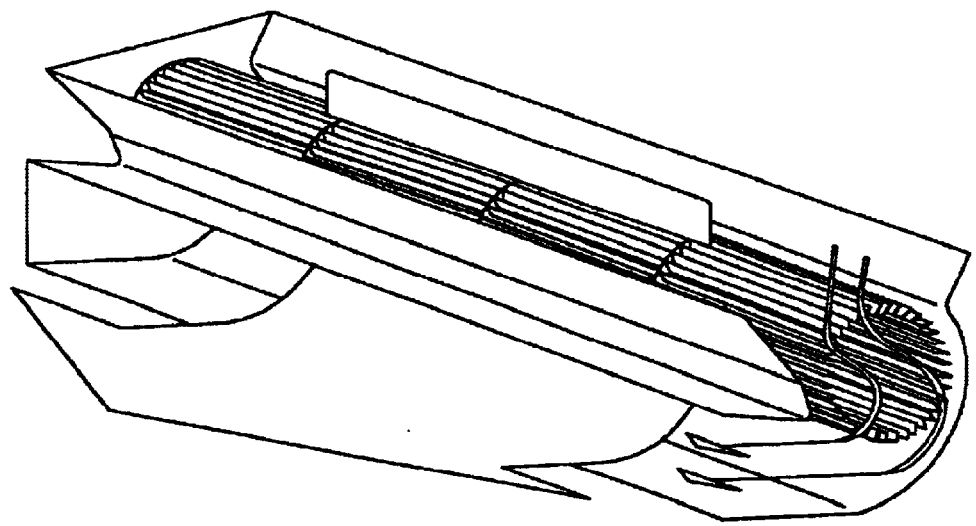
FIG. 2 is a schematic view which illustrates how gas is moved through a blower.
Figure 3:
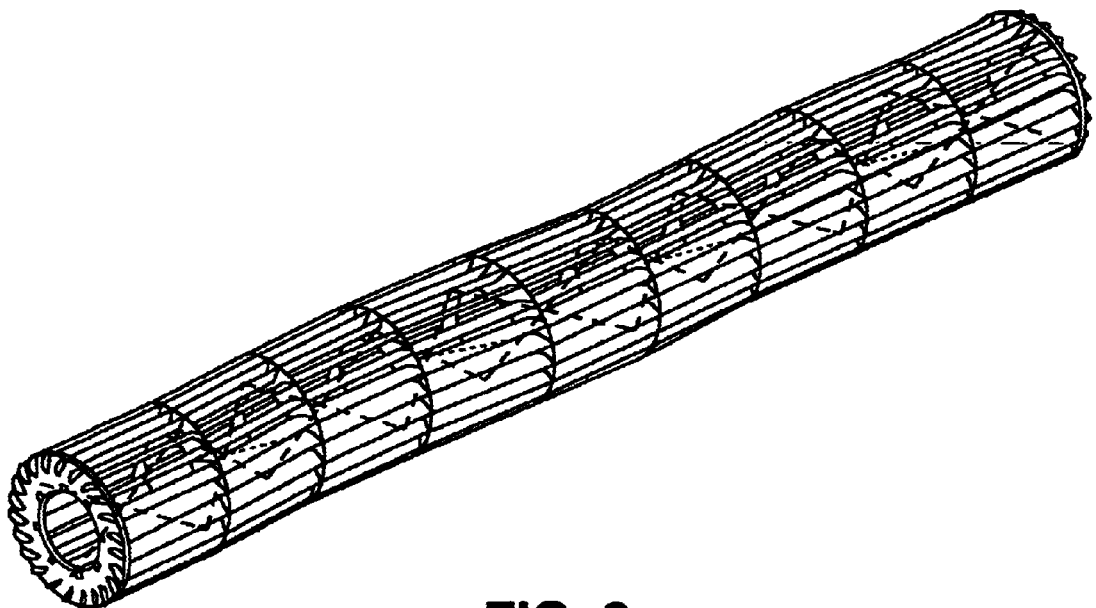
FIG. 3 illustrates a tangential blower described in U.S. Pat. No. 5,870,420.
Figure 4:
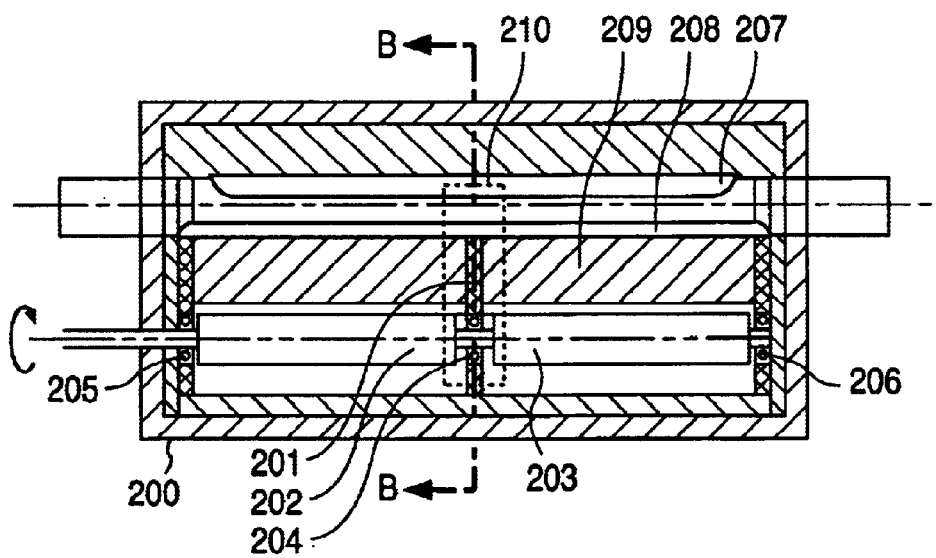
FIG. 4 is a cross-section of a gas discharge laser along the axis of the blowers comprising two adjacent blower sections joined by a flange 201.
Figure 5:
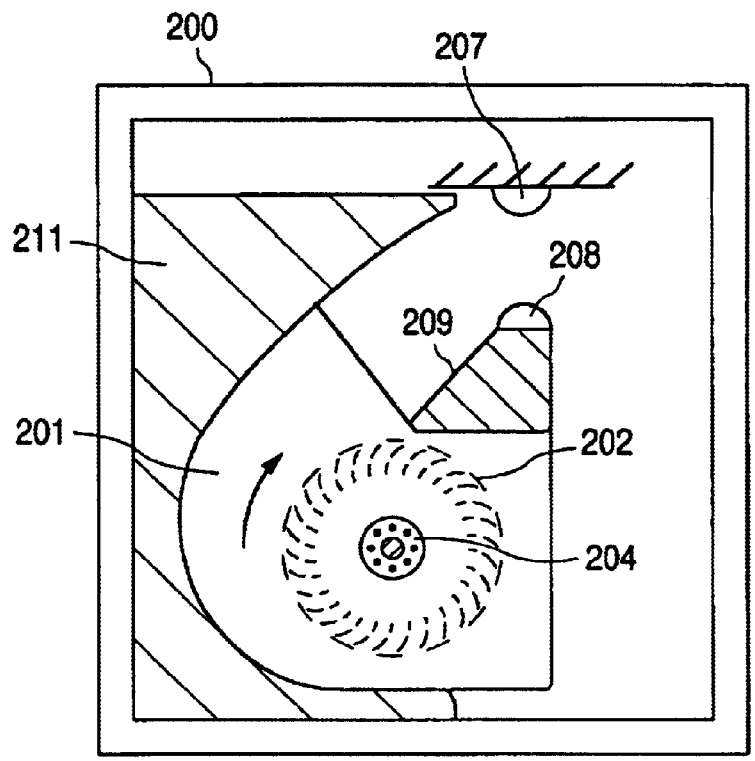
FIG. 5 is an enlarged view of a cross-section of a gas discharge laser along plane B—B shown on FIG. 4, illustrating a side view of a flange 201.

A first embodiment for joining tandem sections of a blower is illustrated in FIGS. 4 and 5. In FIG. 4, gas discharge laser 200 contains flange 201 which joins first blower section 202 and second blower section 203 at bearing 204. Bearing 205 and bearing 204 support blower section 202, and bearing 204 and bearing 206 support blower section 203. The laser gas is discharged into the gap between upper electrode 207 and lower electrode 208. Lower electrode support 209 supports lower electrode 208. FIG. 5 shows a cross-section of the gas discharge laser 200 through plane B—B of FIG. 4. Housing 211 and lower electrode support 209 illustrate how the laser gas is guided towards the gap between upper electrode 207 and lower electrode 208. Bearing 204 is shown supporting blower 202. Blower 202 is indicated with dotted lines because it is on an opposite side of flange 201 and thus would not be visible through plane B—B of FIG. 4.

As seen in FIG. 5, flange 201 separates the laser gas roughly into two volumes, one volume on either side of the flange. There are thus two volumes of laser gas being discharged by the tandem blowers towards the electrode discharge gap separated by a region of inhomogeneity between them.

Figure 6:
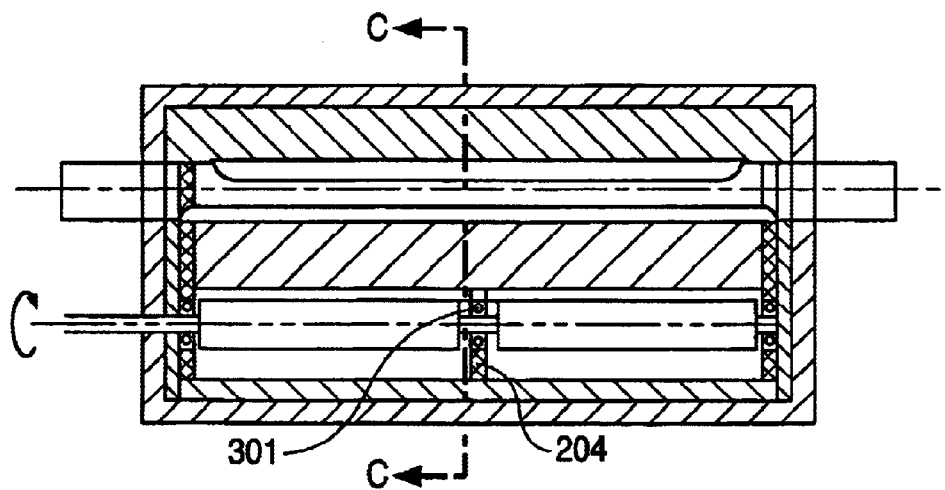
FIG. 6 is a cross-section of a gas discharge laser along the axis of the blowers illustrating the embodiment of flange 301.
Figure 7:
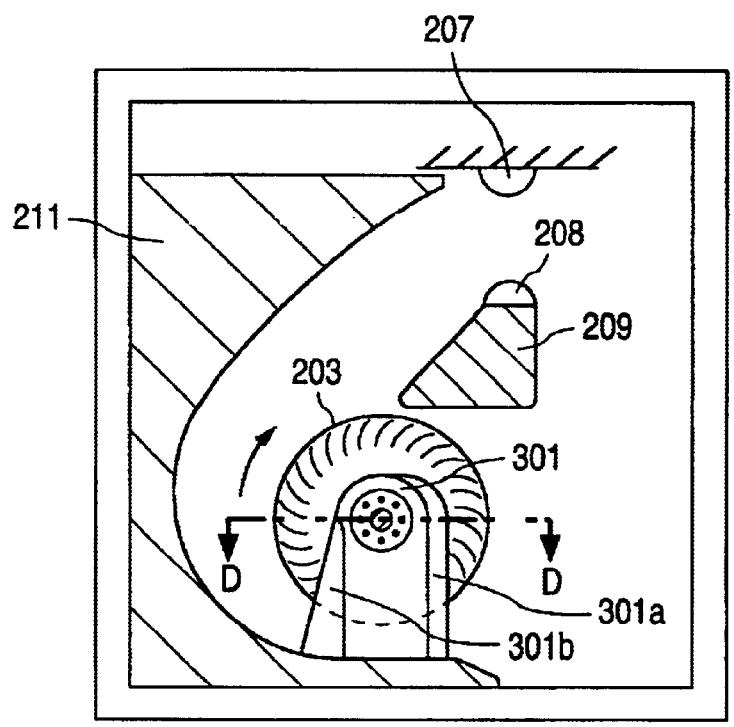
FIG. 7 is a cross-section through plane C—C of FIG. 6 of a gas discharge laser.

In order to reduce or substantially eliminate the volume of inhomogeneous flow in the discharge region between the two volumes of laser gas, a present embodiment of the tandem blowers includes flange 301 depicted in FIGS. 6 and 7. In FIG. 6, flange 301 is shown supporting bearing 204. FIG. 7 is an enlarged view of a cross-section through plane C—C of FIG. 6. FIG. 7 shows flange 301 mounted on the housing 211 only in the region where the outer circumference of the blower nears housing 211 and opposite electrode 207. In contrast to flange 201, this preferred embodiment including the improved flange 301 is not further affixed to housing 211 nor is it affixed to lower electrode support 209. The flange 301 is shared so that it does not interfere with mixing of the gases discharged by adjacent blower sections. Part of a trailing edge 301b of the flange 301 is located inside a cylindrical volume defined by the combined cylindrical forms of the blower sections, as shown in FIG. 7. The left and upper portions of the cylindrical blower 203 are visible in FIG. 7 behind the trailing edge 301b of the flange 301. The discharges of the blower sections are not separated by the flange, which allows the discharged gases to intermix. Once the gas has flowed beyond the trailing edge 301b of the flange 301, it is able to mix with the gas being discharged by the adjacent blower. Thus, the laser gas is allowed to interflow soon after it enters the inlet portion of the blowers, and prior to entering the discharge gap between the electrodes 207 and 208.

Figure 8:
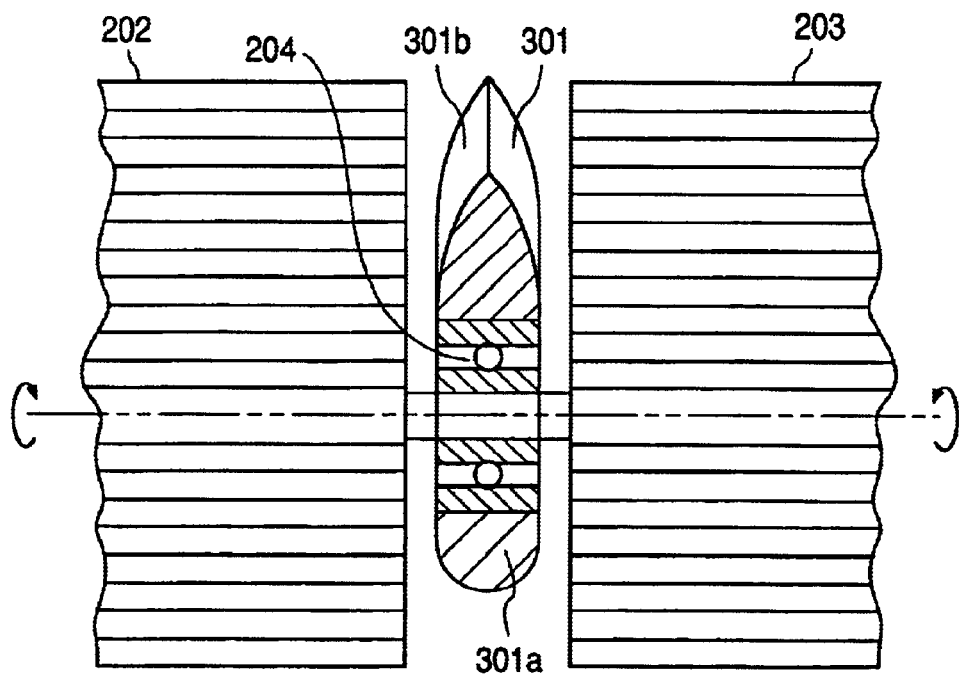
FIG. 8 is a cross-section of the embodiment of flange 301 through plane D—D of FIG. 7.

Flange 301 preferably comprises a leading edge 301a and a trailing edge 301b as depicted in FIGS. 7 and 8. FIG. 8 is a cross-section of the blowers and flange through plane D—D of FIG. 7. In FIG. 8 blower 202 and blower 203 are supported by bearing (may be a double bearing) 204. Leading edge 301a and trailing edge 301b are shaped in an aerodynamic fashion in a preferred embodiment. The aerodynamic shape of the edges 301a and 301b of flange 301 further decreases the volume of the inhomogeneous laser gas flow in the discharge region of the blowers as ell as increase the efficiency of the tandem blowers, e.g., by reducing turbulence created by air flow around the flange.

Figure 9:
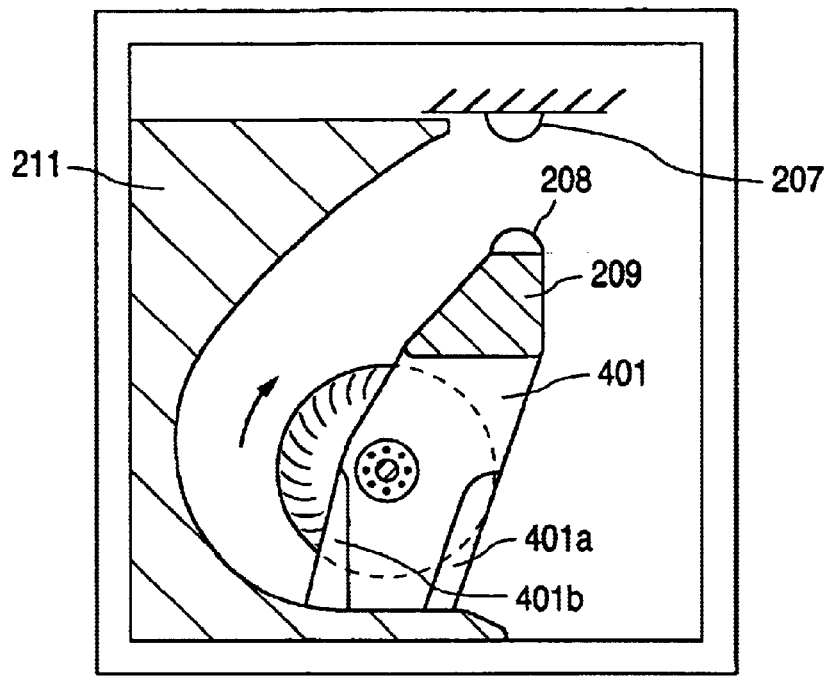
FIG. 9 is a cross-section with the same orientation as that of FIG. 7, illustrating a side view of an other embodiment of flange 401.

Another alternative embodiment of the improved flange is shown in FIG. 9. In this embodiment, the base of improved flange 401 is attached to housing 211, opposite upper electrode 207, and the upper portion of flange 401 is attached to the lower electrode support 209. In this embodiment, leading edge portion 401a and trailing edge portion 401b are shaped in an aerodynamic fashion, e.g., as shown in FIG. 8. In addition, the flange 401 is cut off on the downstream end of the blower compared with flange 201 shown in FIG. 5. As in the FIG. 7 embodiment, the FIG. 9 embodiment has part of a trailing edge 401b of the flange located within a cylindrical volume defined by the combined cylindrical forms of the blower sections. The discharges of the blower sections are not separated by the flange, which allows the discharged gases to intermix. This allows for a reduction of the volume of the inhomogeneous region as it enters the discharge gap between the upper electrode 207 and lower electrode 208, in accord with the alternative embodiment that is shown in FIGS. 7 and 8. An advantage of the embodiment shown at FIG. 9 is improved mechanical stability and reduced vibration sensitivity.

The Shaft and Hub

Figure 10A:
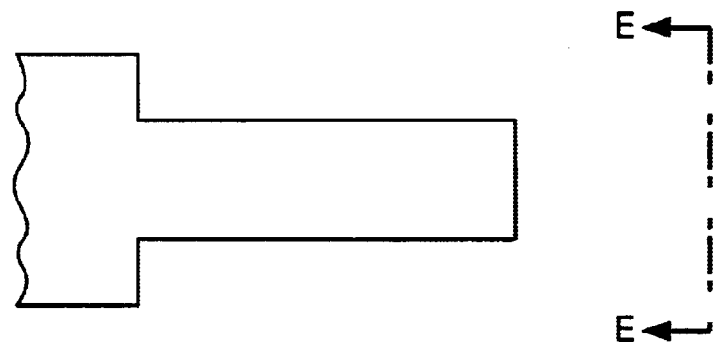
FIG. 10A is a cross-section of the end of the shaft of a conventional tangential blower, in which the plane of the paper is parallel to the shaft's long axis.
Figure 10B:
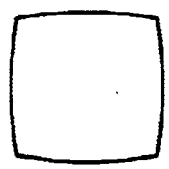
FIG. 10B is a cross-section of the shaft through plane E—E of FIG. 10A.

As shown in FIGS. 10A and 10B, the ends of the shaft of a cross-flow blower for use with an gas discharge laser are formed with a constant thickness in the longitudinal direction. FIG. 10B is a cross-section through plane E—E of FIG. 10A. The shaft of FIGS. 10A–10B has constant thickness and can tend to wear at the ends where the shaft is fixed to the end hub of a blower. Wear is also caused to the end hub due to the vibration of the blower. A reason for this is that a bending mode vibration tends to occur when the blower is in operation. As the blower/shaft assembly rotates and vibrates in a bending mode, a rocking action takes place where the shaft is constricted by the end hub of the blower, this rocking motion thus causing wear to the end hub and the shaft and/or bending shaft and hub respectively 204, 203.

Figure 11A:
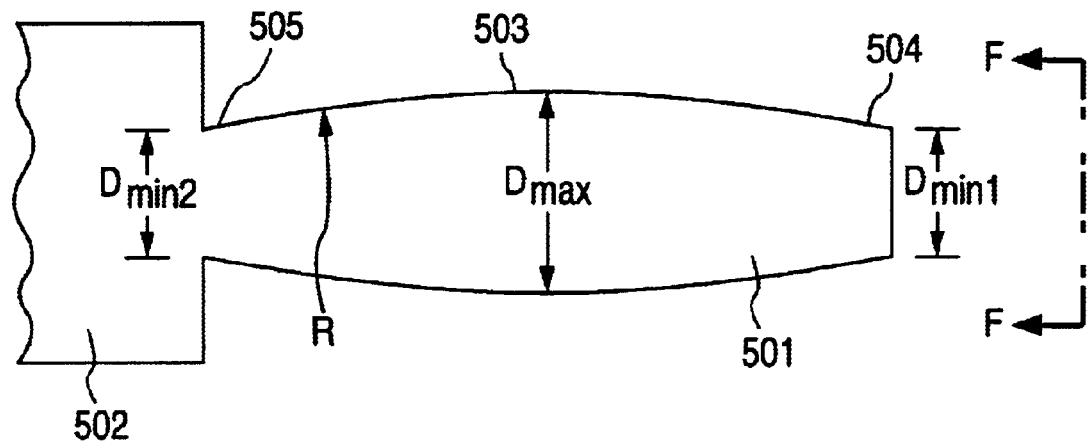
FIG. 11A is a cross-section of the end of the shaft of a tangential blower according to a preferred embodiment, in which the plane of the paper is parallel to the shaft's long axis.
Figure 11B:
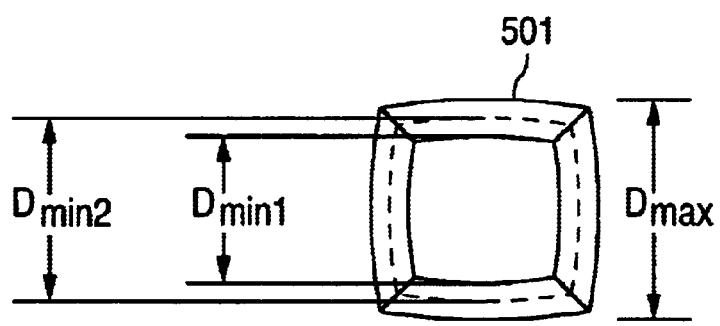
FIG. 11B is a cross-section through plane F—F of FIG. 11A showing the end of the shaft of a tangential blower according to a preferred embodiment.

Therefore, according to a preferred embodiment, the end portion 501 of shaft 502 may be formed as shown in FIGS. 11A and 11B (which are not drawn to scale). FIG. 11A shows the shaft 502, and the shaft end 501. Shaft end 501 has a maximum diameter $D_{max}$ at its center 503 and a minimum diameter $D_{min1}$ at its first end 504 and a minimum diameter $D_{min2}$ at its second end 505. The end portion of the shaft 502 may also have a radius of curvature R, and the end portion of the shaft may be preferably manufactured with a constant radius. The reduction of the end portion 501 diameter from the center to the ends, allows the shaft to rock smoothly in the end hub, thus reducing wear to the shaft and end hub. In a preferred embodiment, the radius of curvature R may be made the same for the top and bottom of the shafts. The larger the radius of curvature, which results in a less severe curve to the shaft, the greater the area of the shaft in contact with the bearing, thus allowing a greater pressure between the bearing and the shaft. Thus R is preferably large compared to the diameter D of the end portion of the shaft. In one embodiment, $D_{max}$=8 mm and $D_{min}$=7.95 mm, thus $D_{max}$-$D_{min}$=0.05 mm. In a preferred embodiment, $D_{max}$-$D_{min}$= 0.02 mm.

Note that the radius of curvature indicated in FIG. 11A appears to be much greater for illustration than would be indicated by the preferred change of diameter. Also, the change in thickness between shaft 502 and end portion 501 would typically be much less than indicated by FIG. 11A. In one embodiment, there is a smooth transition between shaft 502 and end portion 501 with little or no thickness change at the interface.

Also note that in order to reduce wear and/or bending due to the bending mode of the shafts, it is not required that the end portions of the shaft 501 have a constant radius of curvature along its axis, in FIG. 11A. The shaft may have an elliptical shape, a parabolic shape, any smooth shape, or even a step shape with no radius of curvature whatsoever along its axis. As long as the end portion of the shaft 501 has a $D_{max}$-$D_{min}$ in the range of preferably 0.005 mm to 0.05 mm, and generally less than around 1 mm, the wear to the shaft and end hub will be reduced.

According to this aspect of the present invention, the blower end hub is made to receive the cross-sectional shape of shaft end 501 illustrated in FIG. 11B. FIG. 11B is a cross-section view of shaft end 501 through plane F—F. Although polygons are generally considered to be bounded by straight lines, for the sake of convenience the improved blower hub will be referred to as end hub 601, which will be discussed in more detail below. FIG. 11B illustrates that the shaft end 501 is thicker in the middle as defined by $D_{max}$ than at the ends, as defined by $D_{min1}$ and $D_{min2}$.

Casting the Blades, the Hubs and the Polygonal Hub

Figure 12:
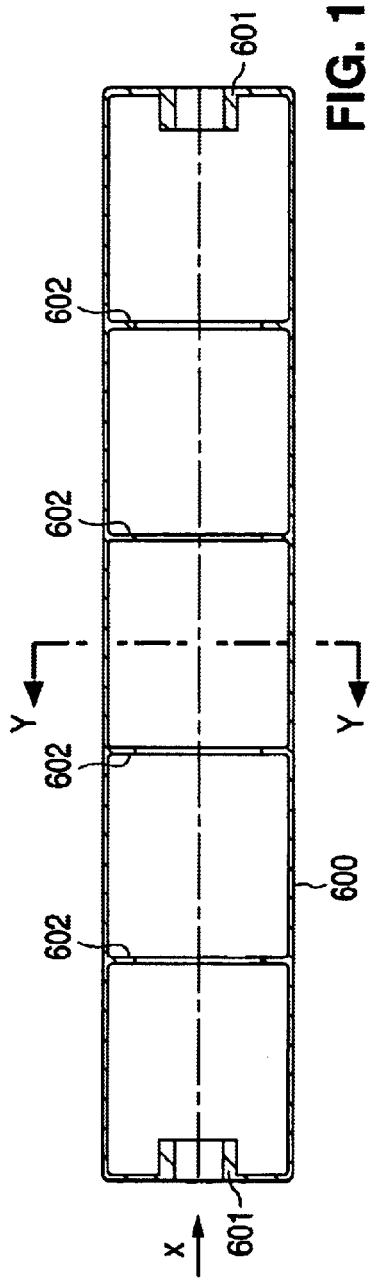
FIG. 12 is a longitudinal cross-section of one embodiment of the blower of a gas discharge laser.
Figure 13:
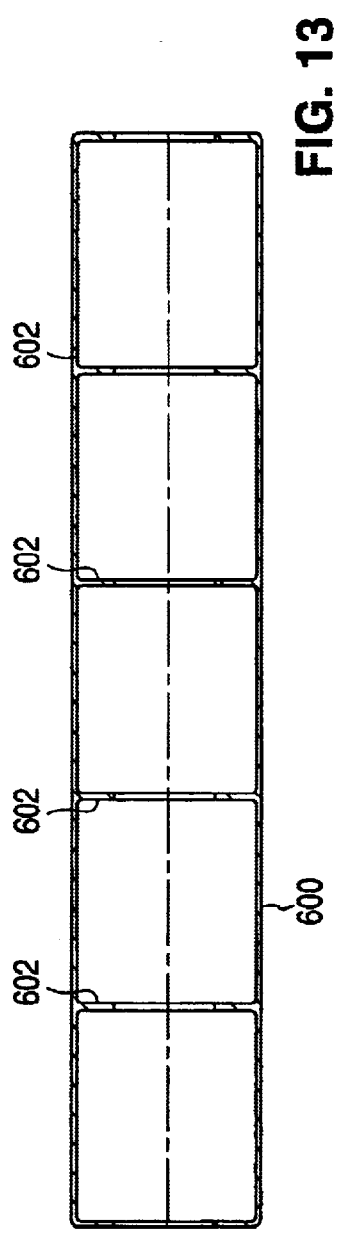
FIG. 13 is a longitudinal cross-section of one embodiment of the blower of a gas discharge laser.
Figure 14:
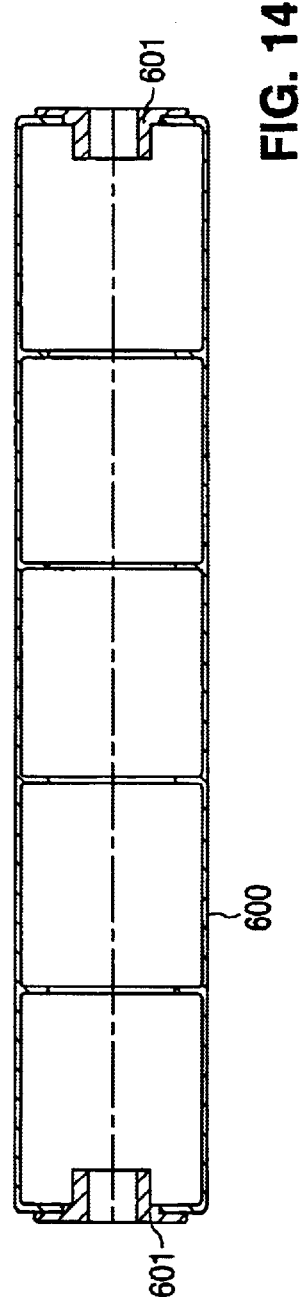
FIG. 14 is a longitudinal cross-section of one embodiment of the blower of a gas discharge laser.

The preferred method of fabricating the blower 600, blower blades, end hubs 601, Internal hubs 602 is by casting them as one piece, as shown in FIG. 12 (blower blades not shown in order to simplify drawing). However, one or more of these components may be formed separately. For example, FIG. 13 illustrates the blower blades, internal hubs 602, and blower 600 cast separately from end hub 601. FIG. 14 shows a separately-cast end hub 601 coupled to a blower like the one illustrated in FIG. 12.

Investment casting, also known as "lost wax" casting, is the preferred method of casting blower 600. However, any form of precision casting, e.g., die casting, may be used. The discussion in Chapter 8 of Davies, *Solidification and Casting* (Applied Science Publishers, Ltd. 1973) describes these well-known processes and is hereby incorporated by reference; copies of the relevant pages are filed herewith.

The first step in the investment casting process is to produce an expendable pattern of the desired blade and hub shape in wax, plastic (e.g., polystyrene) or other pattern material which is easily worked and has a relatively low melting temperature.

The pattern is made by pouring or injecting the pattern material into a mold, generally a metal mold. Although a pattern for a tangential blower could be made in one step using an integral gating system, the pattern is easier to make by assembling separate components (e.g., of the blade and end hub sections) which are formed individually. However, a pattern formed by assembling separate components can be used to make a one-piece casting.

After the pattern is formed, it is dip-coated with a slurry coat of fine particles to give it a smooth surface, "stuccoed" with coarser refractory material and then dried and fired. The pattern material either melts away or will be burned away during the process of firing, whereas the refractory material will harden.

Then, metal is cast into the resulting hollow mold. A tangential blower may be formed of any suitable metal, but alloys of aluminum, magnesium, titanium or steel are preferred. Suitable metal is preferably substantially free of silicon.

Figure 15:
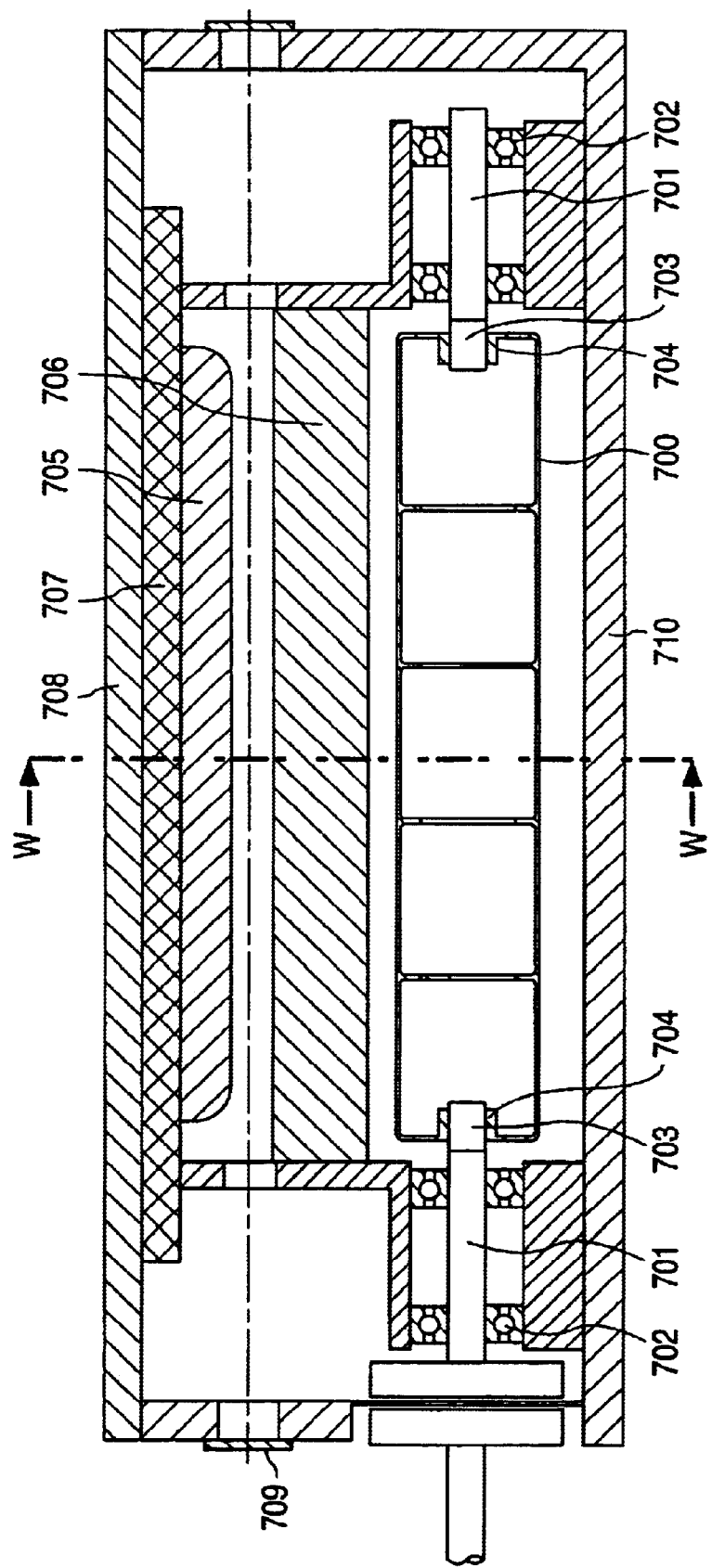
FIG. 15 is a longitudinal cross-section of a gas discharge laser.

Referring to FIG. 15, blower 700 is supported at each end by shafts 701, which are supported for rotation by bearings 702. End portions 703 of shafts 701 engage with blower end hubs 704. Blower 700 circulates laser gas between upper electrode 705 and lower electrode 706. Insulator 707 separates upper electrode 705 and cover 708. Laser windows 709 are formed in tube wall 710.

Aerodynamic Blades

Figure 16:
FIG. 16 is a cross-section of a radial blade used in a conventional tangential blower.

In one embodiment of a tangential blower, the blades have inner and outer surfaces with roughly the same radius of curvature and have a relatively constant cross-sectional thickness from the leading edge to the trailing edge of the blade. FIG. 16 illustrates an enlarged cross-section of a single blade, according to this embodiment, used in a cross-flow blower. The inner and outer surfaces of the blade shown in FIG. 16 have the same radius of curvature and the blade's thickness is roughly constant.

Figure 17:
FIG. 17 is a cross-section of a radial blade for a tangential blower according to one embodiment of the present invention.

According to a preferred embodiment, the blades of an improved tangential blower are formed with differing radii of curvature for the inner and outer surfaces of the blade. One such embodiment is shown in FIG. 17. The shape of blade 801 in FIG. 17 yields a superior aerodynamic performance. A blower with aerodynamically improved blades can move laser gas faster than the same blower rotating at the same speed with conventional blades. In addition, blades 801 add "stiffness" to the blower. Aerodynamic blades may be made by extrusion or any other possible technique as understood by those skilled in the art.

Figure 18:
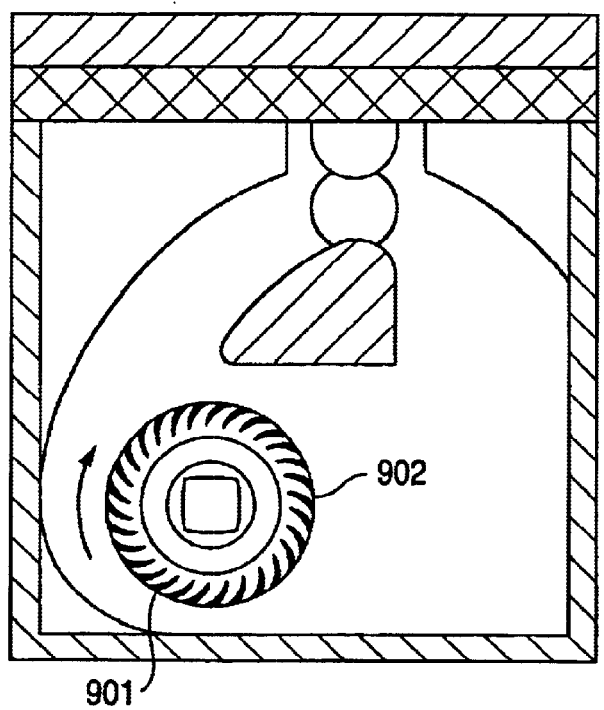
FIG. 18 is a cross-section through the circumference of blower 902 of a gas discharge laser.

The width of blade 801 may vary, but is typically on the order of 10 mm wide, with 20 to 40 blades per blower. Blades 801 run substantially the length of the blower, which is on the order of half a meter. If the blower is divided into sections, the blades run substantially the length of the blower sections. FIG. 18 is a view perpendicular to that of FIG. 15 and illustrates one way that blades 901 may be arranged in blower 902.

It will be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and structural and functional equivalents thereof.

What is claimed is:

1. A gas discharge laser, comprising:
   a housing;
   a first electrode;
   a second electrode;
   a second electrode support;
   a first cross-flow blower section including a plurality of blades, further including a plurality of internal hubs and two end hubs, each of said end hubs coupling with a shaft and defining a cylindrical form extending along a cylindrical axis of the blower section;
   a second cross-flow blower section including a plurality of blades, further including a plurality of internal hubs and two end hubs, each of said end hubs coupling with a shaft and defining a cylindrical form coaxial with the cylindrical form of the first cross-flow blower section, wherein the blower sections are disposed longitudinally along the cylindrical axis so that two end hubs of the blower sections are adjacent to each other; and
   a flange supporting the adjacent hubs of the first and second blower sections, wherein the flange is attached to the housing in an area opposite the electrodes;
   said flange also having a leading edge and a trailing edge with respect to a direction of gas flow, wherein part of the trailing edge of the flange is located inside a cylindrical volume defined by the combined cylindrical forms of the blower sections to permit gas flowing through the two blower sections to combine.

2. A gas discharge laser as in claim 1, said flange not contacting said second electrode support.

3. The gas-discharge laser of any of claim 1 or 2, wherein a cross-section of the flange has an aerodynamic shape with respect to a direction of gas flow.

4. The gas discharge laser of any of claim 1 or 2, wherein each of the blades comprises a top surface having a first radius of curvature and a bottom surface having a second radius of curvature, wherein the first radius of curvature is smaller than the second radius of curvature.

5. The gas discharge laser of claim 1 or 2, wherein each blade has a cross-section shaped like an airfoil.

6. The gas discharge laser of claim 5, wherein inner and outer surfaces of said blades have different radii of curvature.

7. The gas discharge laser of any of claim 1 or 2, wherein a cross-section of the flange has an aerodynamic shape with respect to a direction of the gas flow, wherein each blade has a cross-section shaped like an airfoil, wherein the second end of the flange is coupled to the housing on a side opposite the first electrode.

8. The gas discharge laser of any of claim 1 or 2, wherein the blades, internal hubs and end hubs are composed of one of the group consisting of aluminum alloy, magnesium alloy, titanium alloy and steel.

9. The gas discharge laser of any of claim 1 of 2, wherein the blades, internal hubs and end hubs are composed of aluminum alloy.

10. The gas discharge laser of any of claim 1 or 2, wherein the radial blades, internal hubs and end hubs are composed of magnesium alloy.

11. The gas discharge laser of any of claim 1 or 2, wherein the blades, internal hubs and end hubs are composed of titanium alloy.

12. The gas discharge of any of claim 1 or 2, wherein the blades, internal hubs and end hubs are composed of steel.

13. A gas discharge laser, comprising:
   a housing;
   an upper electrode;
   a lower electrode;
   a lower electrode support; and
   a cross-flow blower, comprising a first shaft and a second shaft, wherein each of the shafts comprise an end portion, wherein each end portion includes a center cross-sectional area, a first end cross-sectional area and a second end cross-sectional area, wherein the center cross-sectional area has a diameter greater than the diameter of the first end cross-sectional area, and wherein the center cross-sectional area has a diameter greater than the second end cross-sectional area, wherein each of the end portions further comprise a minimum diameter $D_{min}$ and wherein $D_{max}-D_{min}$ is approximately 0.02 millimeters.

14. A gas discharge laser, comprising:
   a housing;
   an upper electrode;
   a lower electrode;
   a lower electrode support; and
   a cross-flow blower, comprising a first shaft and a second shaft, wherein each of the shafts comprise an end portion, wherein each end portion includes a center cross-sectional area, a first end cross-sectional area and a second end cross-sectional area, wherein the center cross-sectional area has a diameter greater than the diameter of the first end cross-sectional area, and wherein the center cross-sectional area has a diameter greater than the second end cross-sectional area, wherein each of the end portions further comprise a minimum diameter $D_{min}$ and wherein $D_{max}-D_{min}$ is in the range of 0.005 to 0.05 millimeters.

15. A gas discharge laser, comprising:

a laser tube filled with a gas mixture;

a plurality of electrodes within the discharge chamber for energizing the gas mixture, said plurality of electrodes including a pair of main discharge electrodes spaced apart by a discharge volume;

an optical resonator for generating a laser beam;

a cross-flow blower assembly including a pair of longitudinally adjacent and coaxially disposed cylindrical cross-flow blowers;

a flange supportingly disposed between said pair of cross-flow blowers and coupled to the cross-flow blowers; and an electrode support bar for supporting one of the pair of main discharge electrodes, wherein the electrode support bar extends longitudinally along substantially the entire length of the electrode that it supports, wherein said flange is not coupled directly to said electrode support bar.

16. A gas discharge laser, comprising:

a laser tube defined by a support housing filled with a gas mixture;

a plurality of electrodes defining a discharge volume within the laser tube, the electrodes for energizing the gas mixture, said plurality of electrodes including first and second main discharge electrodes spaced apart by the discharge volume;

a optical resonator for generating a laser beam; and a cross-flow blower assembly for circulating the gas mixture through said discharge volume, said cross-flow blower assembly including a shaft, said shaft including a coupling segment with a longitudinally non-uniform thickness, such that when said blower vibrates in bending mode, said coupling segment rocks smoothly within a mating coupling of the support housing wherein a difference in maximum and minimum thickness of said coupling segment is less than 1.0 mm.

17. The laser of claim 16, wherein said difference is more than 0.005 mm.

18. The laser of claim 16, wherein a difference in maximum and minimum thickness of said coupling segment is between 0.005 mm and 0.05 mm.

* * * * *